UNITED STATES PATENT OFFICE.

JEAN EFFRONT, OF BRUSSELS, BELGIUM.

PROCESS OF FERMENTING ORGANIC NITROGENOUS SUBSTANCES.

953,025.     Specification of Letters Patent.     Patented Mar. 29, 1910.

No Drawing.     Application filed May 14, 1908. Serial No. 432,823.

*To all whom it may concern:*

Be it known that I, JEAN EFFRONT, professor, a subject of the Russian Emperor, residing at Brussels, Belgium, have invented new and useful Improvements in Processes of Fermentation to Obtain Ammonia and Volatile Fatty Acids from Organic Nitrogenous Substances; and I do hereby declare the following to be a full, clear, and exact description of the same.

My present invention has for its object to provide a new process of fermentation to obtain ammonia and volatile fatty acids from organic nitrogenous substances, and it is based on the fact that solutions of amido acids can be brought into fermentation, under certain circumstances, by means of yeast, bakers' yeast or molds. During this fermentation, the whole of the amido acids is decomposed into ammonia and fatty acids, according to the following equation:

(1) $\underset{\text{Glycocoll}}{CH_2NH_2CO_2H} + H_2O =$
$\underset{\text{Ammonia}}{NH_3} + \underset{\text{Acetic acid}}{CH_3CO_2H} + O$ (2) $\underset{\text{Asparamic acid}}{CO_2HCHNH_2CH_2CO_2H} + H_2O =$
$\underset{\text{Ammonia}}{NH_3} + \underset{\text{Propionic acid}}{CH_3CH_2CO_2H} + CO_2 + O.$ The conditions preferred for obtaining a good fermentation without formation of volatile amins and decomposition of fatty acids are the following:

(1) The alkalinity of the fermenting liquid must be maintained above the point corresponding to 4 grams (about 4 to 8 grams) of $K_2CO_3$ per liter.

(2) This liquid must contain only 2 to 5 parts of carbohydrates for 100 parts of amido acids present.

(3) The temperature of the fermentation must not fall below 38° C. and not rise above 43° C. At the beginning of the fermentation, air must be blown through the liquid until the liquid contains 2 grams of ammonia per liter.

(4) The fermenting liquid should preferably contain 0.3 to 1 gram of sulfate of aluminium per liter or equivalent quantities of any other aluminium compounds.

This fermentative power of yeast and mold is due to the fact that these materials always contain germs of butyric ferments, which when developing themselves, produce a special diastase, viz., "the amidase," which decomposes peptids and amido acids into ammonia and fatty acids, in alkaline liquids. These germs are not destroyed at a temperature of 90 to 100° C. and this property may be utilized for the preparation of a culture of these bacteria. This culture is prepared by bringing mold into washes of molasses which have been previously sterilized and made alkaline and maintaining the temperature at 90° C. for half an hour. When allowed to stand at 40° C. for 24 hours, it will enter into strong fermentation with formation of hydrogen. Washes of molasses, corn and beets (residues from alcohol distilleries), as well as waste products from sugar manufactories and foul waters from wool scouring operations, are especially suitable as a cultivating medium for bacteria capable of decomposing amido acids, because these washes, products or waters contain large quantities of amido acids and polypeptids. By this fermentation I obtain a very good utilization of the nitrogen compounds, the nitrogen thereof being directly converted into ammonia and a considerable quantity of fatty acids (acetic, propionic and butyric acids) being obtained at the same time. Ammonia and acids may be removed from the liquid without great expense.

The process is particularly suitable for the treatment of washes of molasses, beets and corn, as well as for the treatment of washes from the manufacture of bakers' yeast, foul waters from wool scouring operations and turf containing large quantities of nitrogen. The washes of molasses, for instance, when discharged from the distilling apparatus have a specific gravity of 1.050 to 1.060 and contain per liter 70 to 90 grams of nitrogenous substances and 2 to 3 grams of sugar, which composition is particularly suitable for the ammoniacal fermentation. In special cases viz. when the specific gravity of the washes is less than 1.050, it is advisable to evaporate them to the above mentioned point before submitting them to the ammoniacal treatment.

Let us suppose the treatment of washes of molasses of 1.050 to 1.060 specific gravity and containing per liter 70 to 90 grams of nitrogenous substances and 2 to 5 grams of sugar. In this case, the process is preferably carried to practice as follows: I take 10 hectoliters of these washes as discharged from the distilling apparatus, cool them to about 40° C. (38 to 43° C.), neutralize them and bring their alkalinity to a point corresponding at least to 4 grams (4 to 8 grams) of $K_2CO_3$ per liter, by means of potash or any other alkali. Then I add to these 10 hectoliters 600 to 1,000 grams of sulfate of aluminium, 200 to 500 grams of calcium superphosphate and 100 kgrs. of pressed yeast or the same quantity of mold and I maintain the temperature at 40° C. After 4 to 6 hours, gas is generated, which indicates that the fermentation has started. 48 hours after this moment, I add to these 10 hectoliters in fermentation 30 to 50 hectoliters of fresh washes, cooled to 40° C., rendered alkaline, and containing the same proportions of sulfate of aluminium and calcium superphosphate, and I leave it again to ferment during 48 hours. The quantity of fermenting liquid may thus be augmented by successive additions to each volume of mash which has fermented during 48 hours, of 3 to 5 volumes of fresh washes cooled to 40° C., rendered alkaline, and containing the same proportions (above stated) of sulfate of aluminium and calcium superphosphate. The alkalinity of the portions of washes successively added must correspond at least to 4 grams of $K_2CO_3$ per liter and should it be lessened during the fermentation, a fresh addition of alkali should be made in order to bring the alkalinity back to the initial point. During the entire period, during which the bub is being prepared, air is blown through the mash under sufficient pressure to maintain the liquid in agitation. This air is at atmospheric temperature. The bacteria culture prepared in this way, works in the ammoniacal fermentation like the bub in the manufacture of alcohol. 5 to 10 hectoliters of this culture or bub are added as seed to each principal mash, say 100 hectoliters of washes of molasses. The portion of the washes of molasses which may be considered as the "principal mash" is preferably less alkaline than the culture serving as bub; in practice, an alkalinity corresponding to 2.5 to 5 grams of $K_2CO_3$ per liter has produced good results; 30 to 50 grams of sulfate of aluminium are preferably added per hectoliter, but superphosphate is as a rule not necessary for washes of molasses. Air is preferably blown through the liquid only during the filling of the vats, which takes generally 6 to 7 hours. At the beginning of the strong fermentation, the ventilation should be stopped on account of the escape of ammonia.

The time of fermentation varies according to the quality of the molasses; in most cases, the fermentation is completed after 2 or 3 days. In order to ascertain this, a small quantity of the fermented liquid to which oxid of magnesium is added, may be distilled; if this distillation gives 90% of the total quantity of nitrogen in the state of ammonia, the fermentation may be considered as being completed.

If the method is carried out according to the conditions stated above, the distilled material will contain pure ammonia and no volatile compounds of amins.

In many cases, it will be advisable to heat the mixture of washes and yeast or mold serving to prepare the above mentioned bub, for half an hour to 90° C., in order to destroy the prejudicial ferments.

During the first period of the work, that is, at the moment when mold or yeast is added to the washes of molasses in order to prepare the bub, the mixture of washes and yeast or mold is preferably heated for half an hour to 90° C., then cooled to 40 to 43° C. and allowed to ferment. In this case, the augmentation of the bub begins a little later than usually: at least 24 hours after the heating, a strong fermentation has been detected. It is not necessary to heat to 90° C. the washes of molasses used for this augmentation. The finished bacteria culture may be kept for a relatively long time, and the same may be used during 8 days for putting mashes into fermentation. The culture may be augmented every 48 hours and continued.

The fermentation vats may also be put into fermentation by pouring one quarter of the contents of one vat into another and then filling the two vats with liquid. Notwithstanding I preferably prepare a new culture every 15 days in order to avoid degeneration and infection.

The washes of molasses of 1.060 to 1.070 specific gravity produce an average quantity of 7 to 7.5 grams of ammonia per liter.

After the ammoniacal fermentation, the ammonia contained in the liquid may generally be removed by distillation without addition of alkali; only in a few cases, an addition of 2 to 3 grams of alkali per liter will prove necessary. After the removal of ammonia, the washes may be treated in the usual way for the extraction of salts, but it is preferable to previously treat the liquid to obtain the volatile fatty acids contained in same. 70 to 80 grams of fatty acids (acetic, propionic and butyric acids) are produced during the ammoniacal fermentation from each liter of washes of molasses of 1.060 to 1.070 specific gravity. I generally remove these acids as follows:—The liquid from which the ammonia is removed is concentrated to 35 or 40° Baumé, mixed with the necessary quantity of sulfuric acid to free the fatty acids contained in the liquid, and is then distilled either by vacuum or by heat. The acids obtained in both cases are separated in the rectifying apparatus and finally I obtain acids which pass at the distillation between 120 and 130° C. These acids may be used industrially either in the state of acids or after their transformation to acetone.

For the treatment of washes of beets or corn, I proceed in the same way as for molasses.

This improved process may also be used for recovering ammonia from sewage or foul waters from wool scouring operations. The manner of working is similar in all cases except that I preferably use lime instead of potash for neutralizing.

Turf is treated as follows:—It is mixed with 5 to 7 volumes of water and brought into a pasty state. Then I add 2 to 3 kilograms of sulfuric acid of 60° Baumé or the equivalent of any other mineral acid per 100 kilograms of turf, and the mixture is boiled under a pressure of 2 to 3 atm. for $\frac{1}{2}$ to 1 hour. The paste is then rendered alkaline with lime and put into fermentation with a culture, preferably cultivated in washes of molasses or corn.

The ammoniacal fermentation may also be effected in washes of 1.070 specific gravity. In certain cases, it will even be advisable to concentrate the liquid to be submitted to the ammoniacal distillation, but in these cases the bacteria culture must also be acclimatized to liquids with a larger percentage of ammonia; this may be obtained very easily by increasing the concentration of the liquid gradually, starting from washes with a specific gravity of 1.028. After 14 to 15 cultures, a tolerance for this high density may be easily obtained if the density be increased systematically for each culture. During this acclimatization, I found that the ferments may easily be accustomed to antiseptic substances, such as formaldehyde, xylol, toluol, hydrofluoric acid salts, so that they finally may effect the fermentation of liquids containing per liter 5 grams of one of these substances. This acclimatization may be useful in certain cases for avoiding secondary fermentations.

Having fully described my invention, what I claim and desire to secure by Letters Patent is:—

1. The process of fermenting organic nitrogenous substances containing albumens, amido-acids, peptids and the like, which consists in rendering the material alkaline, bringing it to a temperature of about 40° C., fermenting the material by organized butyric ferments, and separating the resulting ammonia.

2. The process of fermenting organic nitrogenous substances, such as washes of molasses, turf extract, distillers' and yeast washes, foul waters from wool scouring operations, or wastes from the manufacture of sugar, which consists in rendering alkaline a suspension of these substances to the point corresponding to at least 4 grams of $K_2CO_3$ per liter, bringing the alkaline materials to a temperature of about 40° C., causing the fermentation of said materials by organized butyric ferments, blowing air through the fermenting materials, distilling the fermented materials to separate the ammonia, evaporating the remaining materials, adding mineral acid to the same and distilling the mixture to separate the volatile fatty acids, substantially as set forth.

3. The process of fermenting organic nitrogenous substances, such as washes of molasses, turf extract, distillers' and yeast washes, foul waters from wool scouring operations, or wastes from the manufacture of sugar, which consists in rendering alkaline a suspension of these substances to the point corresponding to at least 4 grams of $K_2CO_3$ per liter, bringing the alkaline materials to a temperature of about 40° C., causing the fermentation of said materials by organized butyric ferments, agitating the fermenting materials, and separating the resulting ammonia.

4. The process of fermenting organic nitrogenous substances, such as washes of molasses, turf extract, distillers' and yeast washes, foul waters from wool scouring operations, or wastes from the manufacture of sugar, which consists in rendering alkaline a suspension of these substances to the point corresponding to at least 4 grams of $K_2CO_3$ per liter, bringing the alkaline materials to a temperature of about 40° C., adding molds containing organized butyric ferments to the alkaline materials to introduce therewith the desired bacteria and thereby obtain the fermentation thereof, blowing air through the fermenting materials, distilling the fermented materials to separate the ammonia, evaporating the remaining materials, adding mineral acid to the same and distilling the mixture to separate the volatile fatty acids, substantially as set forth.

5. The process of fermenting organic nitrogenous substances, such as washes of molasses, turf extract, distillers' and yeast washes, foul waters from wool scouring operations, or wastes from the manufacture of sugar, which consists in rendering alkaline a suspension of these substances to the point corresponding to at least 4 grams of $K_2CO_3$ per liter, bringing the alkaline materials to a temperature of about 40° C., causing the fermentation of said materials by organized butyric ferments, adding aluminium compounds to the fermenting materials to accelerate the fermentation thereof, blowing air through the latter, distilling the fermented materials to separate the ammonia, evaporating the remaining materials, adding mineral acid to the same and distilling the mixture to separate the volatile fatty acids, substantially as set forth.

In testimony whereof, I have signed my name to this specification in the presence of two subscribing witnesses.

JEAN EFFRONT.

Witnesses:
 CHARLES HORROLD,
 GREGORY PHELAN.